(12) United States Patent
McCrary (10) Patent No.: US 11,281,495 B2
(45) Date of Patent: Mar. 22, 2022

(54) TRUSTED MEMORY ZONE (71) Applicant: Advanced Micro Devices, Inc., Santa Clara, CA (US)

(72) Inventor: Rex Eldon McCrary, Oviedo, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 15 days.

(21) Appl. No.: 16/113,211

(22) Filed: Aug. 27, 2018

(65) Prior Publication Data

US 2019/0129754 A1 May 2, 2019

Related U.S. Application Data (60) Provisional application No. 62/577,335, filed on Oct. 26, 2017.

(51) Int. Cl.
*G06F 9/455* (2018.01)
*G06F 9/50* (2006.01)
*G06F 12/02* (2006.01)
*G06F 21/60* (2013.01)
*G06F 21/78* (2013.01)

(52) U.S. Cl.
CPC .......... *G06F 9/5011* (2013.01); *G06F 12/023* (2013.01); *G06F 21/602* (2013.01); *G06F 21/78* (2013.01); *G06F 2212/251* (2013.01)

(58) Field of Classification Search
CPC ................................................. G06F 9/5011
See application file for complete search history.

(56) References Cited

U.S. PATENT DOCUMENTS

| | | | |
|---|---|---|---|
| 5,522,075 A | 5/1996 | Robinson et al. |
| 5,822,778 A | 10/1998 | Dutton et al. |
| 5,826,084 A | 10/1998 | Brooks et al. |
| 6,061,711 A | 5/2000 | Song et al. |
| 6,785,886 B1 | 8/2004 | Lim et al. |
| 7,707,341 B1 | 4/2010 | Klaiber et al. |
| 7,937,700 B1 | 5/2011 | Klaiber et al. |
| 7,962,909 B1 | 6/2011 | Klaiber |
| 8,078,792 B2 | 12/2011 | Serebrin et al. |

(Continued)

OTHER PUBLICATIONS

Kaplan et al., "AMD Memory Encryption", White Paper, Advanced Micro Devices, Inc., Apr. 21, 2016, 12 pages.

(Continued)

*Primary Examiner* — Hang Pan
(74) *Attorney, Agent, or Firm* — Kowert Hood Munyon Rankin and Goetzel PC; Rory D. Rankin (57) ABSTRACT

A system and method for providing security of sensitive information within chips using SIMD micro-architecture are described. A command processor within a parallel data processing unit, such as a graphics processing unit (GPU), schedules commands across multiple compute units based on state information. When the command processor determines a rescheduling condition is satisfied, it causes the overwriting of at least a portion of data stored in each of the one or more local memories used by the multiple compute units. The command processor also stores in the secure memory a copy of state information associated with a given group of commands and later checks it to ensure corruption by a malicious or careless program is prevented.

19 Claims, 6 Drawing Sheets

(56) References Cited

U.S. PATENT DOCUMENTS

| | | |
|---|---|---|
| 8,099,541 B2 | 1/2012 | Serebrin |
| 8,561,060 B2 | 10/2013 | Serebrin et al. |
| 9,147,086 B1 | 9/2015 | Potlapally et al. |
| 9,294,282 B1 | 3/2016 | Potlapally et al. |
| 2003/0217250 A1 | 11/2003 | Bennett et al. |
| 2004/0117532 A1 | 6/2004 | Bennett et al. |
| 2005/0081199 A1 | 4/2005 | Traut |
| 2005/0091652 A1 | 4/2005 | Ross et al. |
| 2006/0005084 A1 | 1/2006 | Neiger et al. |
| 2006/0066623 A1* | 3/2006 | Bowen .......... G06F 9/3851 345/506 |
| 2006/0206892 A1 | 9/2006 | Vega et al. |
| 2007/0106986 A1 | 5/2007 | Worley, Jr. |
| 2008/0282093 A1* | 11/2008 | Hatakeyama ....... G06F 12/1416 713/190 |
| 2009/0113111 A1 | 4/2009 | Chen et al. |
| 2009/0187726 A1 | 7/2009 | Serebrin et al. |
| 2010/0083259 A1* | 4/2010 | Veal .......... H04L 12/56 718/102 |
| 2014/0096134 A1 | 4/2014 | Barak et al. |
| 2015/0143362 A1 | 5/2015 | Lukacs et al. |
| 2015/0248357 A1 | 9/2015 | Kaplan et al. |
| 2015/0324287 A1* | 11/2015 | Priel .......... G06F 12/0897 711/118 |
| 2016/0140343 A1 | 5/2016 | Novak et al. |
| 2016/0164880 A1 | 6/2016 | Colesa et al. |
| 2016/0246736 A1 | 8/2016 | Lee et al. |
| 2016/0371152 A1* | 12/2016 | Parshin .......... G06F 21/54 |
| 2017/0171164 A1 | 6/2017 | Alexander et al. |
| 2017/0177398 A1 | 6/2017 | Bacher et al. |
| 2018/0019979 A1 | 1/2018 | Bacher et al. |
| 2018/0165224 A1 | 6/2018 | Brown et al. |

OTHER PUBLICATIONS

Kaplan, David, "Protecting VM Register State With SEV-ES", White Paper, Advanced Micro Devices, Inc., Feb. 17, 2017, 8 pages.

Adams et al., "A Comparison of Software and Hardware Techniques for X86 Virtualization", Proceedings of the 12th International Conference on Architectural Support for Programming Languages and Operating Systems, Oct. 21-25, 2006, 12 pages.

"AMD64 Technology: AMD64 Architecture Programmer's Manual vol. 2: System Programming", Publication No. 24593, Revision 3.12, Sep. 2006, pp. 355-411.

Gum, P.H., "System/370 Extended Architecture: Facilities for Virtual Machines", IBM Journal of Research and Development, Nov. 1983, pp. 530-544, vol. 27, No. 6.

Turley, James L., "Chapter 9: 8086 Emulation", Advanced 80386 Programming Techniques, 1988, pp. 283-315, Osborne McGraw-Hill, Berkeley, CA, USA.

Non-Final Office Action in U.S. Appl. No. 11/740,463, dated Apr. 28, 2011, 16 pages.

Non-Final Office Action in U.S. Appl. No. 12/272,956, dated Mar. 18, 2011, 6 pages.

Non-Final Office Action in U.S. Appl. No. 12/272,955, dated Mar. 18, 2011, 9 pages.

International Search Report and Written Opinion in International Application No. PCT/US2009/000410, dated Oct. 16, 2009, 12 pages.

* cited by examiner

TRUSTED MEMORY ZONE

CROSS REFERENCE TO RELATED APPLICATIONS

This application claims priority to Provisional Patent Application Ser. No. 62/577,335, entitled "Trusted Memory Zone", filed Oct. 26, 2017, the entirety of which is incorporated herein by reference.

BACKGROUND

Description of the Relevant Art

The parallelization of tasks is used to increase the throughput of computer systems. To this end, compilers extract parallelized tasks from program code to execute in parallel on the system hardware. To increase parallel execution on the hardware, a processor uses multiple parallel execution lanes, such as in a single instruction multiple word (SIMD) micro-architecture. This type of micro-architecture provides higher instruction throughput for particular software applications than a single-lane micro-architecture or a general-purpose micro-architecture. Examples of tasks that benefit from a SIMD micro-architecture are video graphics rendering, cryptography, and garbage collection.

Recently, software development kits (SDKs) and application programming interfaces (APIs) were developed for use with widely available high level languages to provide supported function calls. The function calls provide an abstraction layer of the parallel implementation details of a parallel data processing unit with a SIMD micro-architecture. The details are hardware specific to the parallel data processing unit but hidden to the developer to allow for more flexible writing of software applications. The tasks being parallelized come from at least scientific, medical and business (finance) applications. The processing of these tasks on a combination of a general purpose central processing unit (CPU) pipeline and the SIMD micro-architecture pipeline is generally referred to as general-purpose computing on graphics processing units (GP GPU). Therefore, the SIMD micro-architecture is available for expanded uses outside of video graphics rendering and the like.

The tasks benefitting from the use of the SIMD micro-architecture are capable of processing sensitive information such as financial data, passwords, cryptographic keys, proprietary multimedia content and private network traffic. Globally, consumers purchase proprietary multimedia content in a digital format on a daily basis. Examples of the content are movies, video games, recorded concerts and so on. The proprietary multimedia content is stored on high definition digital versatile discs (HD DVDs), Blue-ray discs, Flash storage and hard disk drives (HDDs). The proprietary multimedia content is accessed by hardware and software via multimedia players, computing devices and network connections. The playback of the proprietary multimedia content uses processing by the SIMD micro-architecture.

As chips using the SIMD micro-architecture are also used in cloud computing services, both local users and remote users of a computing device are able to gain access to a chip with the SIMD micro-architecture. Such chips use different levels and types of local memory. Different tasks share the resources, including the local memory, of these chips. As the local data exists between tasks, these chips store residual data, which is also referred to as data remanence. The residual data includes the previous examples of sensitive information.

In view of the above, efficient methods and systems for providing security of sensitive information within chips using SIMD micro-architecture are desired.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for providing security of sensitive information within chips using SIMD micro-architecture are contemplated. A computing system uses a general-purpose central processing unit (CPU) and a parallel data processing unit, which utilizes a single instruction multiple word (SIMD) micro-architecture. In various embodiments, the parallel data processing unit is a graphics processing unit (GPU). The SIMD micro-architecture uses multiple compute resources and one or more non-secure memories, each accessed by at least one of the multiple compute resources. In various embodiments, each of the compute resources is a pipelined lane for executing a work item of many work items. Each work unit is a combination of a command and respective data. One or more other pipelines uses the same instructions for the command, but operate on different data. Each pipelined lane is also referred to as a compute unit.

The parallel data processing unit uses various types of memories such as a local data store shared by two or more compute units within a group, command and data caches shared by each of the compute units, and local registers in register files within each of the compute units. The parallel data processing unit additionally uses secure memory for storing secure programs and secure data accessible by only a controller within the parallel data processing unit. The controller is also referred to as a command processor within the parallel data processing unit. In various embodiments, the command processor decodes requests to access information in the secure memory and prevents requestors other than itself from accessing content stored in the secure memory. In other embodiments, a memory controller is provided for verifying requests. For example, a range of addresses in on-chip memory within the parallel data processing unit is allocated for providing the secure memory. If an address within the range is received, the command processor or the memory controller decodes other attributes of the transaction, such as a source identifier (ID), to determine whether or not the request is sourced by the command processor.

In various embodiments, the command processor schedules commands stored in an external command ring buffer for execution on the compute resources within the parallel data processing unit. Other embodiments use buffers other than the external command ring buffer. In various embodiments, the command processor schedules commands based on state information. For example, in some embodiments, the command processor schedules commands with a protected (trusted) state as assigned by the kernel mode driver to each of the compute units. In other examples, when the parallel data processing unit uses a relatively large number of compute units, the command processor partitions the compute units. In such a case, the command processor schedules commands with a protected (trusted) state to a first set of compute units, and schedules commands with an unprotected (non-trusted) state to a second set of compute units different from the first set.

When the command processor determines a rescheduling condition is satisfied, the command processor accesses a secure program stored in the secure memory within the parallel data processing unit and runs the secure program to overwrite at least a portion of each of the one or more local memories such as one or more of the register files and local data stores in the compute units. It is noted that in some embodiments the overwriting of the memories as described herein is performed by a secure program. In other embodiments, the overwriting is performed by a hardware mechanism. Both embodiments are possible and are contemplated. As local data exists between tasks in one or more of the register files and local data stores in the compute units, the local storage stores residual data, which is also referred to as data remanence. In some embodiments, the residual data includes sensitive information such as financial data, passwords, cryptographic keys, proprietary multimedia content and private network traffic.

In some embodiments, the secure program is a graphics shader program. In one embodiment, the secure program is used to overwrite the entirety of each of one or more of the register files and local data stores such as repeatedly using a given value. In one example, the repeated value is zero and the secure program zeroes out each of the one or more of the register files and local data stores.

In another embodiment, the secure program is used to overwrite portions of one or more of the register files and local data stores in a manner to make reengineering the original values significantly difficult. For example, the secure program overwrites different portions starting at non-repeating offsets and with different portion sizes. The values used to overwrite the portions do not repeat either to provide unpredictable behavior. After overwriting at least some portions of each of one or more of the register files and local data stores, the command processor schedules commands to the compute units using a different algorithm. For example, the command processor switches from scheduling commands with a protected state on all compute units to scheduling commands with an unprotected state on all compute units.

In some embodiments, the rescheduling condition is satisfied when the command processor determines no compute units are available for commands with a state different from a currently used state. For example, when the command processor schedules commands with a protected state across all compute units and a group of commands with an unprotected state are stored in the command ring buffer, the command processor detects the group of commands in the command ring buffer and determines the rescheduling condition is satisfied. In some embodiments, a number of commands with a different state, a size of a command group with a different state, or an elapsed time of idle storage for a command group with a different state exceeds a threshold and this detected condition satisfies the rescheduling condition.

In another example, the command processor schedules commands with a protected state on half of the compute units and schedules commands with an unprotected state on the other half of the compute units. When the number of commands with an unprotected state, the size of one or more command buffers filled with commands of the unprotected state, or an idle time for these command buffers exceeds a threshold, then the use of half of the compute units is providing inefficient processing of commands, and the rescheduling condition is satisfied. In some embodiments, a combination of states is used to determine the rescheduling condition. For example, the command processor uses a combination of a computing state (versus a graphics state) and a protected/trusted state (versus an unprotected/non-trusted state) to schedule commands to a portion or all of the compute units. In some embodiments, the computing state distinguishes GPGPU work from video graphics work indicated by the graphics state. Additionally, a process identifier (ID) is also used in the combination.

Since in various situations, the kernel mode driver is untrusted as it could be controlled by a malicious program, the command processor stores state information associated with a given group of commands and later checks it. The state information is stored in the secure memory. Examples of the state information are a process identifier (ID), a protected/unprotected mode, a compute/graphics type of work, and so on. In some embodiments, the command processor checks the copy of the state information stored in the secure memory against one or more copies of the state information stored in non-secure memory and/or in registers within the compute units. If a mismatch is found, the command processor generates an exception, which, in one embodiment, halts execution of the parallel data processing unit.

In some embodiments, the command processor performs the check of the state information when the command processor determines a given time interval has elapsed. In one embodiment, similar to the command processor executing a secure program, such as the shader program, to overwrite portions of the non-secure memories, the command processor accesses and executes a second secure program stored in the secure memory for comparing the copy of the state information in the secure memory and the one or more copies of the state information stored in other data storage in the parallel data processing unit. In other embodiments, when the command processor determines a register write operation targets state information, the command processor replaces at least a portion of the write data for the register write operation with the state information stored in secure memory. The register write operation completes with the replaced portion of the write data and any corruption of the state information due to malicious intent or accidental intent is prevented.

Figure 1:
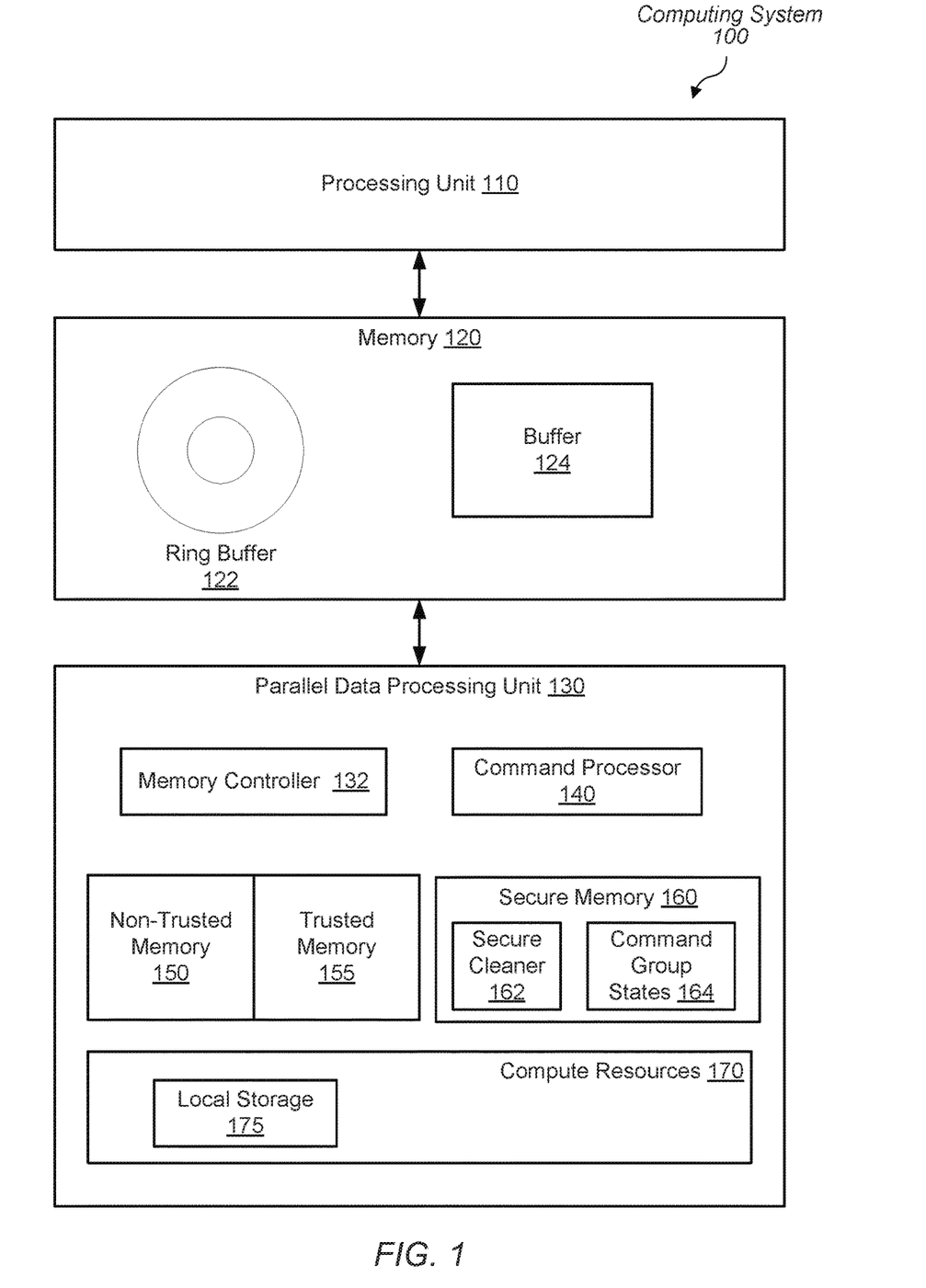
FIG. 1 is a generalized diagram of one embodiment of a computing system.

Turning now to FIG. 1, one embodiment of a computing system 100 is shown. As shown, the computing system 100 includes a processing unit 110, a memory 120 and a parallel data processing unit 130. In some embodiments, the functionality of the computing system 100 is included as components on a single die, such as a single integrated circuit. In other embodiments, the functionality of the computing system 100 is included as multiple dies on a system-on-a-chip (SOC). In various embodiments, the computing system 100 is used in a desktop, a portable computer, a mobile device, a server, a peripheral device, or other.

The processing unit 110 processes instructions of a predetermined algorithm. The processing includes fetching instructions and data, decoding instructions, executing instructions and storing results. In one embodiment, the processing unit 110 uses one or more processor cores with circuitry for executing instructions according to a predefined general-purpose instruction set. For example, the x86, x86-64®, Alpha®, PowerPC®, MIPS®, PA-RISC®, or any other instruction set architecture is selected.

In various embodiments, the parallel data processing unit 130 uses a data parallel micro-architecture that provides high instruction throughput for a computational intensive task. In one embodiment, the parallel data processing unit 130 uses one or more processor cores with a relatively wide single instruction multiple data (SIMD) micro-architecture to achieve high throughput in highly data parallel applications. Each object is processed independently of other objects, but the same sequence of operations is used.

In one embodiment, parallel data processing unit 130 is a graphics processing unit (GPU). Modern GPUs are efficient for data parallel computing found within loops of applications, such as in applications for manipulating and displaying computer graphics, molecular dynamics simulations, finance computations, and so forth. The highly parallel structure of GPUs makes them more effective than general-purpose central processing units (CPUs), such as processing unit 110, for a range of complex algorithms.

In various embodiments, threads are scheduled on one of the processing unit 110 and the parallel data processing unit 130 in a manner that each thread has the highest instruction throughput based at least in part on the runtime hardware resources of the processing unit 110 and the parallel data processing unit 130. In some embodiments, some threads are associated with general-purpose algorithms, which are scheduled on the processing unit 110, while other threads are associated with parallel data computational intensive algorithms such as video graphics rendering algorithms, which are scheduled on the parallel data processing unit 130.

Some threads, which are not video graphics rendering algorithms, still exhibit parallel data and intensive throughput. These threads have instructions which are capable of operating simultaneously with a relatively high number of different data elements. Examples of these threads are threads for scientific, medical, finance and encryption/decryption computations. These threads were traditionally scheduled on the processing unit 110. However, the high parallelism offered by the hardware of the parallel data processing unit 130 and used for simultaneously rendering multiple pixels, is capable of also simultaneously processing the multiple data elements of the scientific, medical, finance, encryption/decryption and other computations.

To change the scheduling of the above computations from the processing unit 110 to the parallel data processing unit 130, software development kits (SDKs) and application programming interfaces (APIs) were developed for use with widely available high level languages to provide supported function calls. The function calls provide an abstraction layer of the parallel implementation details of the parallel data processing unit 130. The details are hardware specific to the parallel data processing unit 130 but hidden to the developer to allow for more flexible writing of software applications. The function calls in high level languages, such as C, C++, FORTRAN, and Java and so on, are translated to commands which are later processed by the hardware in the parallel data processing unit 130. Although a network interface is not shown, in some embodiments, the parallel data processing unit 130 is used by remote programmers in a cloud computing environment. Cloud service providers sell the use of the compute resources 170 of the parallel data processing unit 130 as a service.

While processing instructions or translated commands, each of the processing unit 110 and the parallel data processing unit 130 performs calculations and generates memory access requests for storing result data and for retrieving instructions and operand data. In addition to using local memory within a processing unit, each of the processing unit 110 and the parallel data processing unit 130 accesses the memory 120. The memory 120 is any suitable memory device. Examples of the memory devices are RAMBUS dynamic random access memories (DRAMs), synchronous DRAMs (SDRAMs), DRAM, static RAM, three-dimensional (3D) integrated DRAM, etc.

In some embodiments, the address space of the computing system 100 is divided among the processing unit 110 and the parallel data processing unit 130 with a portion shared among them. Each one of the processing units 110 and 130 uses a respective memory map for determining which addresses are mapped to it, and hence to which one of the processing units 110 and 130 a memory request for a particular address should be routed.

In various embodiments, a software application begins execution on the processing unit 110. Function calls within the application are translated to commands by a given API. The processing unit 110 sends the translated commands to the memory 120 for storage in the ring buffer 122. The commands are placed in groups referred to as command groups. In some embodiments, the processing units 110 and 130 use a producer-consumer relationship, which is also be referred to as a client-server relationship. The processing unit 110 writes commands into the ring buffer 122. Then the parallel data processing unit 130 reads the commands from the ring buffer 122, processes the commands, and writes result data to the buffer 124. The processing unit 110 is configured to update a write pointer for the ring buffer 122 and provide a size for each command group. The parallel data processing unit 130 updates a read pointer for the ring buffer 122 and indicates the entry in the ring buffer 122 at which the next read operation will use. In various embodiments, the memory controller 132 in the parallel data processing unit 130 performs these steps.

In some embodiments, the command processor 140 is used as a controller for scheduling the received command groups onto the compute resources 170. During processing of the command groups, both the non-trusted memory 150 and the trusted memory 155 are used. The non-trusted memory 150 is also referred to as the non-trusted memory zone (non-TMZ) 150 and the trusted memory 155 is also referred to as the trusted memory zone (TMZ) 155. In various embodiments, the memories 150 and 155 are storage locations within DRAM associated with separate address ranges.

The non-trusted memory 150 is associated with data with an unprotected state, whereas the trusted memory 155 is associated with data with a protected state. In various embodiments, the command processor 140 schedules commands to the compute resources 170 based on state information. Examples of the state information are a process identifier (ID), a protected/unprotected mode/state, a compute or graphics type of work, and so on.

In various embodiments, commands with the protected state are able to read and write the trusted memory 155 as well as read from the non-trusted memory 150. However, the commands with the protected state are unable to write to the non-trusted memory 150. Therefore, commands with the protected state running on the parallel data processing unit 130 are unable to read data in the trusted memory 155, such as proprietary decrypted multimedia data, and write it to external disk storage.

Additionally, commands with the unprotected state are able to read and write the non-trusted memory 150 as well as write to the trusted memory 155. However, the commands with the unprotected state are unable to read from the trusted memory 155. The use of the protected/unprotected state and the memories 150 and 155 tagged as non-trusted and trusted, respectively, provides a level of security during the processing of commands. In some embodiments, malicious or careless programs attempt to change the protected/unprotected state of commands which allows full access to both the non-trusted memory 150 and the trusted memory 155. As described shortly, the command processor 140 takes steps to prevent allowing such full access. Although the memories 150 and 155 outside of the compute resources 170 are tagged, local storage 175 within the compute resources 170, such as RAM, caches, registers, local data stores and so on, also store sensitive information while not being tagged. The command processor 140 takes steps to also protect the sensitive information stored in at least a portion of the local storage 175.

The secure memory 160 stores secure programs and secure data accessible by only the command processor 140. In some embodiments, the content stored in the secure memory 160 is also accessed by the memory controller 132. In various embodiments, the command processor 140 decodes requests to access information in the secure memory 160 and prevents requestors other than itself from accessing the content.

In some embodiments, a range of addresses in the on-die memory within the parallel data processing unit 130 is allocated for providing each of the non-trusted memory 150, the trusted memory 155 and the secure memory 160. If an address within the range is received, the command processor 140 or the memory controller 132 decodes other attributes of the transaction, such as a source identifier (ID), to determine whether or not the request is sourced by the command processor 140.

The result data produced by processing the scheduled commands on the compute resources 170 are sent to the memory 120 for storage in the buffer 124. When the command processor 140 determines a rescheduling condition is satisfied, the command processor 140 accesses the secure cleaner program 162 stored in the secure memory 160 and runs the secure cleaner program 162 to overwrite at least a portion of the local storage 175. In some embodiments, the secure cleaner program 162 is an initiator program that begins the cleaning of at least a portion of the local storage 175. In one embodiment, the secure cleaner program 162 causes a hardware mechanism, including a hardware sequence machine and the hardware clearing mechanism, to overwrite values and clear at least a portion of the local storage 175. In various embodiments, each of the hardware sequence machine and the hardware clear mechanism uses dedicated hardware within the parallel data processing unit 130 used only for overwriting or clearing purposes. In various embodiments, examples of the portions of the local storage 175 overwritten or cleared by the secure cleaner program 162 or by other mechanisms initiated by the secure cleaner program 162 are registers in register files within compute units (not shown) in the compute resources 170 as well as the local data stores within the compute units (also not shown).

In some embodiments, the secure cleaner program 162 is a graphics shader program. In one embodiment, the secure cleaner program 162 is used to overwrite the entirety of the register files and local data stores in the local storage 175 such as repeatedly using a given value. In one example, the repeated value is zero and the secure cleaner program 162 zeroes out one or more of the register files and local data stores in the local storage 175. In another embodiment, the secure cleaner program 162 is used to overwrite portions of one or more of the register files and local data stores in the local storage 175 in a manner to make reengineering the original values significantly difficult. For example, the secure cleaner program 162 overwrites different portions starting at non-repeating offsets and with different portion sizes. The values used to overwrite the portions do not repeat either to provide unpredictable behavior.

After overwriting at least a portion of the register files and local data stores in the local storage 175, the command processor 140 schedules commands to the compute resources 170 using a different algorithm. For example, the command processor 140 switches from scheduling commands with a protected state on the compute resources 170 to scheduling commands with an unprotected state. Additionally, in some embodiments, the command processor 140 stores state information associated with a given command group in the secure memory 160 as command group states 164 and later checks it. As described earlier, examples of the state information are a process identifier (ID), a protected/unprotected mode, a compute/graphics type of work, and so on.

During processing of the given command group, one or more copies of the state information is stored registers in the local storage 175. The one or more copies should not be modified, but malicious or careless programs modify them. In some embodiments, the command processor 140 checks the copy of the state information stored in the command group states 164 against the one or more copies of the state information stored in the local storage 175. The command processor 140 performs the checking after determining a particular time interval has elapsed. In some embodiments, the command processor 140 accesses and executes a second secure program (not shown) stored in the secure memory 160 for performing the comparison. If a mismatch is found, the command processor 140 generates an exception, which, in one embodiment, halts execution of the parallel data processing unit 130.

In other embodiments, during processing of the given command group, when the command processor 140 determines a register write operation targets state information in the local storage 175, the command processor 140 replaces at least a portion of the write data for the register write operation with the state information stored in the command group states 164. The register write operation completes with the replaced portion of the write data and any corruption of the state information due to malicious intent or accidental intent is prevented.

Figure 2:
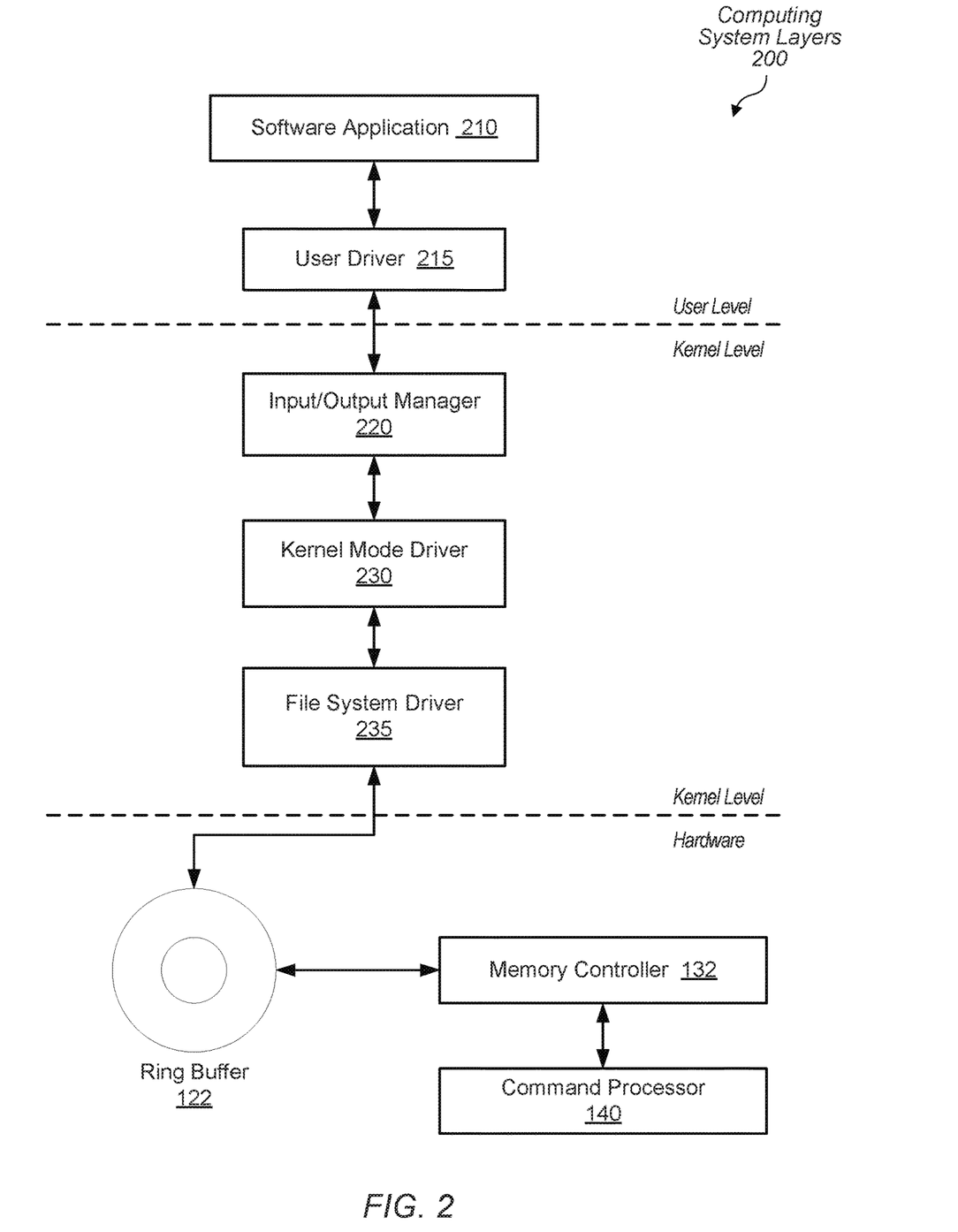
FIG. 2 is a generalized diagram of one embodiment of a computing system software and hardware layering model.

Turning now to FIG. 2, one embodiment of a software and hardware layering model 200 for a computing system is shown. Similar system components as described above are numbered identically. As shown, model 200 uses a collection of user mode components, kernel mode components and hardware. A layered driver model, such as model 200, is one manner to process the application 210 and I/O requests. In this model, each driver is responsible for processing a part of a request. If the request cannot be completed, information for the lower driver in the stack is set up and the request is passed along to that driver. Such a layered driver model allows functionality to be dynamically added to a driver stack. It also allows each driver to specialize in a particular type of function and decouples it from having to know about other drivers.

In various embodiments, the software application 210 is a computer program written by a developer in one of a variety of high level programming languages such as such as C, C++, FORTRAN, and Java and so on. The software application 210 begins being processed on a general-purpose processing unit such as a CPU. A graphics library uses the user driver 215 to translate function calls in the application 210 to commands particular to a piece of hardware, such as a particular graphics processing unit (GPU), and send the translated commands to the kernel mode driver 230.

The computer program in the chosen higher-level language is partially processed with the aid of graphic libraries with their own application program interfaces (APIs). Platforms such as OpenCL (Open Computing Language), OpenGL (Open Graphics Library) and OpenGL for Embedded Systems (OpenGL ES), are used for running programs on GPUs from AMD, Inc. Additionally, CUDA is a platform for running programs on GPUs from NVidia Corp. In some embodiments, developers use OpenCL for simultaneously processing the multiple data elements of the scientific, medical, finance, encryption/decryption and other computations while using OpenGL and OpenGL ES for simultaneously rendering multiple pixels for video graphics computations. Further, DirectX is a platform for running programs on GPUs in systems using one of a variety of Microsoft operating systems.

In some embodiments, the translated commands are sent to the kernel mode driver 230 via the input/output (I/O) driver 220. In one embodiment, an I/O control system call interface is used. Although a single driver, the input/output (I/O) driver 220, is shown, multiple drivers exist in a stack of drivers between the application 210 and a piece of hardware for processing a request targeted at the piece of hardware. In other embodiments, the translated commands are directly sent to the kernel mode driver 230. In various embodiments, the kernel mode driver 230 redirects I/O requests to the driver managing the target device object, such as file system driver 235 for a memory.

The file system driver 235 provides a means for the application 210 to send information, such as the translated commands, to storage media such as the ring buffer 122 on system memory. These requests are dispatched to the file system driver 235 via the I/O manager 220 or the kernel mode driver 230. In some embodiments, the user driver 215 ensures only one process sends translated commands to the hardware of the GPU at a time by using the locking primitives. In some embodiments, the user driver 215 sends command groups to the kernel mode driver 230. The command groups are a set of commands to be sent and processed atomically. In some embodiments, the kernel mode driver 230 assigns state information for a command group. Examples of state information were provided earlier. The kernel mode driver 230 sends the command group and state information to the ring buffer 122 in the hardware layer via the file system driver 235.

The memory controller 132 in the hardware layer accesses the command group and state information stored in the ring buffer 122. The command processor 140 uses interfaces to the memory controller 132 for accessing the commands stored on the ring buffer 122, to compute resources on the parallel data processing unit and to secure memory storing at least the secure cleaner program. A control unit within the command processor schedules the retrieved commands based on state information and prevents data corruption by "cleaning" local memory in the compute resources, checking state information during the processing of the commands and/or preventing overwrites of the state information.

Figure 3:
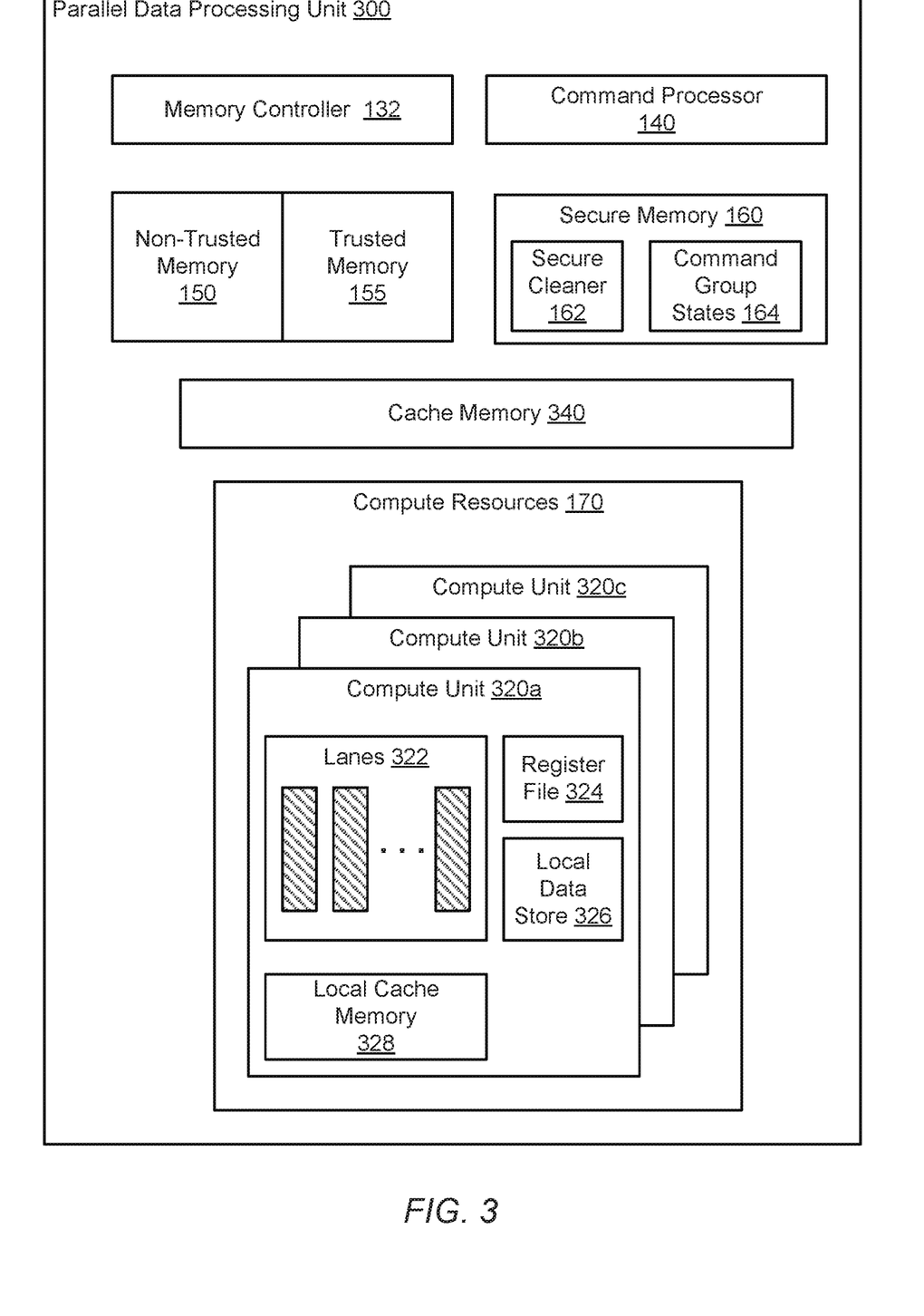
FIG. 3 is a generalized diagram of another embodiment of a parallel architecture processor.

Turning now to FIG. 3, one embodiment of a parallel data processing unit 300 is shown. Circuitry and logic previously described are numbered identically. Although an example of a single instruction multiple data (SIMD) micro-architecture is shown for the parallel data processing unit 300, other types of highly parallel data micro-architectures are possible and contemplated. As shown earlier, the parallel data processing unit 300 uses a memory controller 132, a command processor 140, non-trusted memory 150, trusted memory 155, secure memory 160 and compute resources 170. The compute resources 170 includes the multiple compute units 320a-320c, each with multiple lanes 322. Each lane is also referred to as a SIMD unit or a SIMD lane. In some embodiments, the lanes 322 operate in lockstep. As shown, each of the compute units 320a-320c also includes a respective register file 324, a local data store 326 and a local cache memory 328.

In some embodiments, the local data store 326 is shared among the lanes 322 within each of the compute units 320a-320c. In other embodiments, a local data store is shared among the compute units 320a-320c. Therefore, it is possible for one or more of lanes 322 within the compute unit 320a to share result data with one or more lanes 322 within the compute unit 320b based on an operating mode.

In various embodiments, the data flow within each of the lanes 322 is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. Each of the computation units within a given row across the lanes 322 is the same computation unit. Each of these computation units operates on a same instruction, but different data associated with a different thread.

Each of the compute units 320a-320c accesses the cache 340 for instructions. In addition, the cache 340 stores operand data to load into the register files 324. In some embodiments, an operating system (OS) scheduler or a user-level scheduler schedules workloads on the parallel data processing unit 300 using a variety of schemes such as a round-robin scheme, a priority scheme, an availability scheme or a combination. Alternatively, a programmer schedules the workloads in combination with the runtime system. In such a case, the programmer utilizes a software platform to perform the scheduling. As described earlier, the OpenCL, OpenGL and OpenGL ES platforms are used to provide low-level application programming interfaces (APIs) for translating high-level function calls to commands specific to the hardware of the GPU being used.

In one example, the OpenCL platform defines execution queues and each queue is associated with an OpenCL device. An OpenCL device is either a general-purpose central processing unit (CPU) or a GPU. Function calls are referred to as OpenCL compute kernels, or simply "compute kernels". A software programmer schedules the compute kernels in the execution queues. A compute kernel is matched with one or more records of data to produce one or more work units of computation. Each work unit has a unique identifier (ID). Each of the compute units 320a-320c is assigned one of the many work units by the OS or by the software programmer. Each of the lanes 322 within a given one of the compute units 320a-320c is assigned a thread within the assigned work unit. However, in various embodiments, the command processor 140 overrides the scheduling based on state information as described earlier.

Each of the lanes 322 accesses the local data store 326. For example, in various embodiments, each of the lanes 322 has allocated space within the local data store 326. In some embodiments, each of the lanes 322 within a given one of the compute units 320a-320c has access to the allocated space of the other lanes within the same given compute unit. The lanes 322 within a same one of the compute units 320a-320c have access to each other's allocated space due to processing a same work unit. As described earlier, the command processor 140 uses the secure cleaner program 162 to overwrite at least a portion of one or more of the register file 324 and the local data store 326 within each of the compute units 320a-320c.

Figure 4:
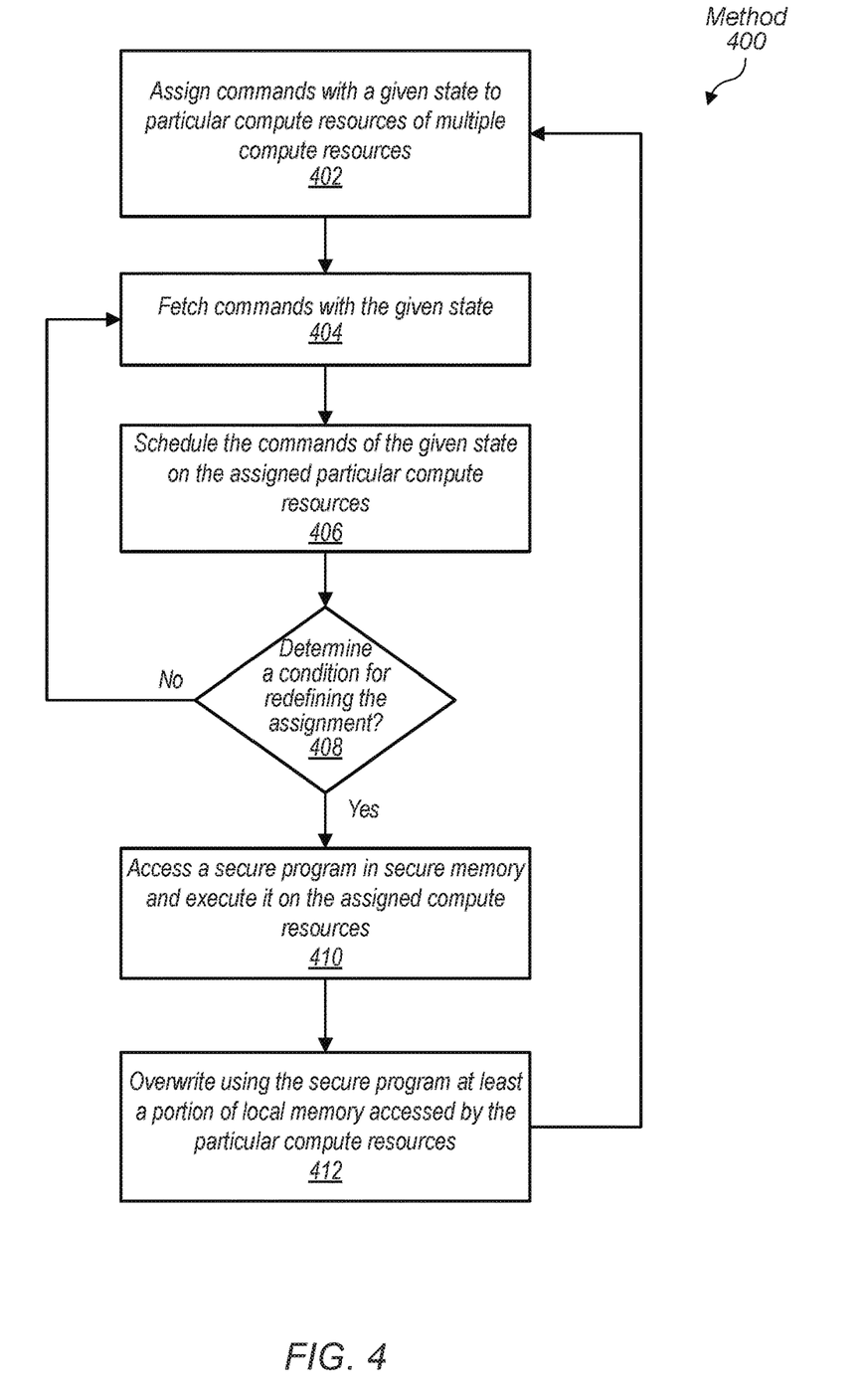
FIG. 4 is a generalized diagram of one embodiment of a method for providing security for sensitive information within chips using SIMD micro-architecture.

Referring now to FIG. 4, one embodiment of a method 400 for providing security for sensitive information within chips using SIMD micro-architecture is shown. For purposes of discussion, the steps in this embodiment (as well as in FIGS. 5 and 6) are shown in sequential order. However, in other embodiments some steps occur in a different order than shown, some steps are performed concurrently, some steps are combined with other steps, and some steps are absent.

One or more processors execute threads of one or more applications. In some embodiments, some threads are associated with general-purpose algorithms, other threads are associated with parallel data computational intensive algorithms, and yet other threads are associated with GPGPU algorithms. Work for a parallel data processing unit, such as a GPU in one embodiment, has functional calls translated to commands specific to the type of parallel data processing unit being used. The commands are stored in a ring buffer for access by the parallel data processing unit. The parallel data processing unit uses multiple compute resources, such as multiple compute units. Commands with a given state are assigned to particular compute resources of multiple compute resources (block 402). In one embodiment, the command processor being used as a controller makes the assignment. In some embodiments, the command processor reads and executes firmware defining an algorithm to use for making the assignments.

The commands with the given state are fetched (block 404). For example, the command processor of the parallel data processing unit retrieves command from a particular command buffer within a ring buffer. The selection of which command buffer to access is based on the given state. In some embodiments, the given state is one of a protected state or an unprotected state. In other embodiments, a combination of states is used such as a protected/unprotected state combined with a compute/graphics state and/or a process ID.

The commands of the given state are scheduled on the assigned particular compute resources (block 406). In some embodiments, the assigned particular compute resources are all of the compute resources within the parallel data processing unit. In other embodiments, the assigned particular compute resources are a fraction of the total compute resources within the parallel data processing unit. In some embodiments, a rescheduling condition is satisfied when the command processor determines no compute units are available for commands with a state different from a currently used state. For example, when the command processor schedules commands with a protected state across all compute units and a group of commands with an unprotected state are stored in the command ring buffer, the command processor detects the group of commands in the command ring buffer and determines the rescheduling condition is satisfied. In other embodiments, a number of commands with a different state, a size of a command group with a different state, or an elapsed time of idle storage for a command group with a different state exceeds a threshold and this detected condition satisfies the rescheduling condition.

If a condition for redefining the assignment is not determined ("no" branch of the conditional block 408), then control flow of method 400 returns to block 404 and more commands of the given state are fetched for processing. If a condition for redefining the assignment is determined ("yes" branch of the conditional block 408), then a secure program in secure memory is accessed and executed on the assigned compute resources (block 410). As local data exists between tasks in one or more of the register files and local data stores in the compute units at this time, the local storage stores residual data, which is also referred to as data remanence. In some embodiments, the residual data includes sensitive information such as financial data, passwords, cryptographic keys, proprietary multimedia content and private network traffic.

In various embodiments, the secure program is a graphics shader program stored in secure memory. The secure program is used to overwrite at least a portion of local memory accessed by the particular compute resources (block 412). In some embodiments, the secure program is an initiator program that begins the cleaning of at least a portion of the local memory. In one embodiment, the secure program begins a hardware mechanism such as both a hardware sequence machine that overwrites values in a sequence of steps and an instantaneous clearing of at least a portion of the local memory via a hardware mechanism. In various embodiments, examples of the local memory being overwritten are one or more of the registers in the register files in the compute units as well as the local data stores in the compute units. In one embodiment, the secure program is used to overwrite the entirety of each of the local memory such as repeatedly using a given value. In one example, the repeated value is zero and the secure program zeroes out each of the local memories.

In another embodiment, the secure program is used to overwrite portions of each of the local memories in a manner to make reengineering the original values significantly difficult. For example, the secure program overwrites different portions starting at non-repeating offsets and with different portion sizes. The values used to overwrite the portions do not repeat either to provide unpredictable behavior.

Figure 5:
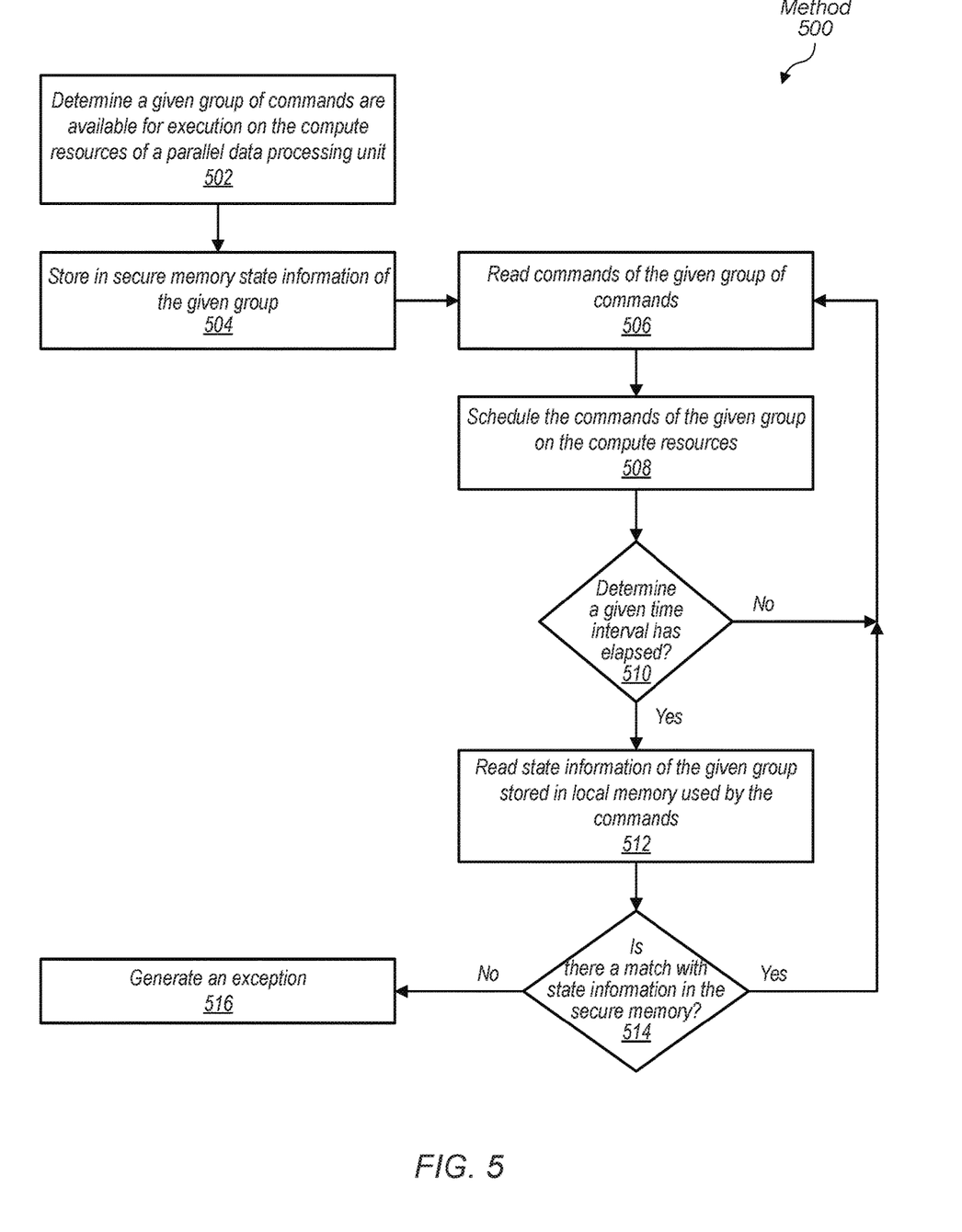
FIG. 5 is a generalized diagram of one embodiment of a method for verifying state information for a command group.

Referring now to FIG. 5, one embodiment of a method 500 for verifying state information for a command group is shown. A given group of commands is determined to be available for execution on the compute resources of a parallel data processing unit (block 502). Since in various situations, the kernel mode driver is untrusted as it could be controlled by a malicious program, the command processor stores state information associated with a given group of commands and later checks it. State information for the given group is stored in secure memory (block 504).

In some embodiments, the state information uses at least a protected state or an unprotected state. In other embodiments, a combination of states is used in the state information such as a protected/unprotected state combined with a compute/graphics state. Additionally, in some embodiments, a process ID is used in the combination. In various embodiments, only a command processor of the parallel data processing unit has access to the secure memory within the parallel data processing unit. In some embodiments, a memory controller additionally has access to the secure memory but verifies the accesses based on at least an address range and attributes associated with the command processor such as a source ID.

Commands of the given group are read (block 506) and scheduled on the compute resources (block 508). If a given time interval has not elapsed ("no" branch of the conditional block 510), then control flow of method 500 returns to block 506 for reading more commands from the given command group. If the given time interval has elapsed ("yes" branch of the conditional block 510), then one or more copies of the state information of the given command group are read from local memory (block 512). In various embodiments, examples of the local memory being read for comparison are the registers in the register files in the compute units as well as the local data stores in the compute units. These copies are compared to the copy of state information of the given command group stored in the secure memory.

If there is a match with the copy of the state information in the secure memory ("yes" branch of the conditional block 514), then the state information has not been corrupted and control flow of method 500 returns to block 506 for reading more commands from the given command group. However, if the comparison results in finding a mismatch with the copy of the state information in the secure memory ("no" branch of the conditional block 514), then an exception is generated (block 516) so an indication is presented to the user. In various embodiments, further execution of any commands by the parallel data processing unit is also suspended.

Figure 6:
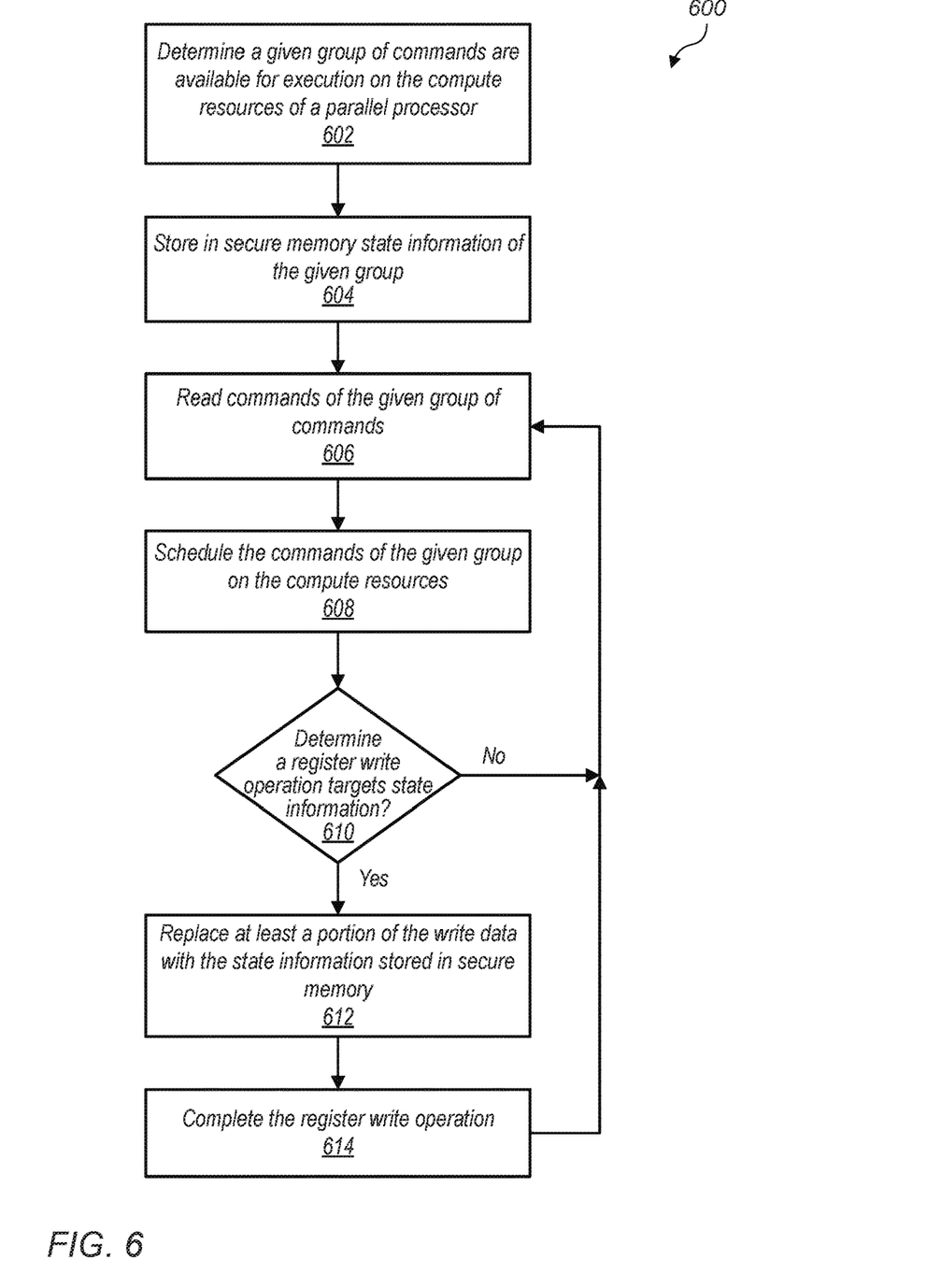
FIG. 6 is a generalized diagram of one embodiment of a method for preventing modification of the state information of a command group.

Referring now to FIG. 6, one embodiment of a method 600 for preventing modification of the state information of a command group is shown. A given group of commands is determined to be available for execution on the compute resources of a parallel data processing unit (block 602). As described earlier, in some embodiments, the given group is stored in a ring buffer accessed by a command processor within a parallel data processing unit. State information of the given group is retrieved and stored in secure memory (block 604). As described earlier, examples of the state information being stored are one or more of a protected/unprotected state, a process ID, a compute/graphics state, and so forth. In other embodiments, a combination of states is used in the state information such as a protected/unprotected state combined with a compute/graphics state. Commands of the given group are read (block 606) and scheduled on the compute resources (block 608).

If it is determined no register write operation targets state information ("no" branch of the conditional block 610), then control flow of method 600 returns to block 606 for reading more commands from the given command group. If it is determined a register write operation targets state information ("yes" branch of the conditional block 610), then at least a portion of the write data is replaced with the state information stored in secure memory (block 612).

In various embodiments, examples of the local memory having state information targeted are the registers in the register files in the compute units as well as the local data stores in the compute units. For example, a malicious or a careless program intends to overwrite state information such as one or more of a protected/unprotected state, a process ID, a compute/graphics state, and so forth. One or more of the command processor and the memory controller detects this write operation, and while allowing the write operation to complete, replaces the portion of the write data corresponding to the state information. The data used to replace the write data comes from the copy of the state information stored in secure memory. Therefore, no corruption of the state information occurs by the malicious or a careless program.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a plurality of compute resources, each of said compute resources comprising:
one or more pipelined execution lanes configured to execute commands; and
local memory configured to store trusted information;
a controller; and
secure memory configured to store a secure program accessible by only the controller;
wherein the controller is configured to:
schedule commands with a given state to particular pipelined execution lanes of the plurality of compute resources; and
in response to determining a rescheduling condition is satisfied, cause overwriting of at least a portion of one or more of the local memories before access by one or more pipelined execution lanes of the plurality of compute resources.

2. The computing system as recited in claim 1, wherein the given state indicates one of a protected mode or an unprotected mode.

3. The computing system as recited in claim 1, wherein the rescheduling condition comprises determining no compute resources are available for commands with a state different than the given state.

4. The computing system as recited in claim 1, wherein the particular compute resources comprises each one of the plurality of compute resources.

5. The computing system as recited in claim 1, wherein the controller is further configured to store, in the secure memory, state information associated with a given group of commands.

6. The computing system as recited in claim 5, wherein in response to determining a given time interval has elapsed, the controller is further configured to:
compare the state information of the given group of commands stored in the secure memory with a copy of state information of the given group of commands stored in the one or more local memories; and
generate an exception responsive to determining a mismatch when comparing.

7. The computing system as recited in claim 5, wherein in response to determining a register write operation targets state information, the controller is further configured to:
replace at least a portion of write data for the register write operation with the state information stored in secure memory; and
complete the register write operation with the replaced portion of the write data.

8. The computing system as recited in claim 5, wherein the state information associated with the given group of commands comprises one or more of a process identifier (ID) and a protected mode.

9. The computing system as recited in claim 1, wherein the plurality of compute resources comprises compute units of a graphics processing unit and the controller comprises a command scheduler of the graphics processing unit.

10. A method comprising:
accessing one or more local memories by at least one of a plurality of compute resources comprising one or more pipelined execution lanes configured to execute a command, wherein each of the one or more local memories store trusted information;
storing a secure program in secure memory accessible by only a controller;
scheduling commands with a given state to particular pipelined execution lanes of the plurality of compute resources; and
in response to determining a rescheduling condition is satisfied, overwriting at least a portion of one or more of the local memories before access by one or more pipelined execution lanes of the plurality of compute resources.

11. The method as recited in claim 10, wherein the given state indicates one of a protected mode or an unprotected mode.

12. The method as recited in claim 10, wherein the rescheduling condition comprises determining no compute resources are available for commands with a state different than the given state.

13. The method as recited in claim 10, wherein the particular compute resources comprises each one of the plurality of compute resources.

14. The method as recited in claim 10, further comprising storing, in the secure memory, state information associated with a given group of commands.

15. The method as recited in claim 14, wherein in response to determining a given time interval has elapsed, the method further comprises:
comparing the state information of the given group of commands stored in the secure memory with a copy of state information of the given group of commands stored in the one or more local memories; and
generating an exception responsive to determining a mismatch when comparing.

16. A controller comprising:
a first interface to a memory controller used for accessing a ring buffer configured to store commands;
a second interface to a plurality of compute resources, each:
comprising one or more pipelined execution lanes configured to execute a command; and
configured to access one or more local memories used for storing trusted information;
a control unit;
a third interface to secure memory configured to store a secure program accessible by only the control unit;
wherein the control unit is configured to:
read commands from the ring buffer via the first interface;
schedule commands with a given state to particular pipelined execution lanes of the plurality of compute resources; and
in response to determining a rescheduling condition is satisfied, overwrite at least a portion of one or more of the local memories before access by one or more pipelined execution lanes of the plurality of compute resources.

17. The controller as recited in claim 16, wherein the given state indicates one of a protected mode or an unprotected mode.

18. The controller as recited in claim 16, wherein the rescheduling condition comprises determining no compute resources are available for commands with a state different than the given state.

19. The controller as recited in claim 16, wherein the particular compute resources comprises each one of the plurality of compute resources.

\* \* \* \* \*